(12) United States Patent
Meissner et al.

(10) Patent No.: US 7,896,393 B2
(45) Date of Patent: Mar. 1, 2011

(54) AIRBAG MODULE

(75) Inventors: Dirk Meissner, Berlin (DE); Juan Fernàndez, Berlin (DE); Kliment Vidolov, Berlin (DE); Dieter Markfort, Berlin (DE); Thomas Lube, Berlin (DE); Michael Hänsel, Bergfelde (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/656,890

(22) Filed: Feb. 18, 2010

(65) Prior Publication Data

US 2010/0201110 A1 Aug. 12, 2010

Related U.S. Application Data

(60) Division of application No. 12/230,545, filed on Aug. 29, 2008, now Pat. No. 7,690,680, which is a continuation of application No. PCT/EP2007/001872, filed on Mar. 5, 2007.

(30) Foreign Application Priority Data

Mar. 3, 2006 (DE) .................. 10 2006 010 953

(51) Int. Cl.
*B60R 21/26* (2006.01)
(52) U.S. Cl. .................. 280/736; 280/741; 102/704
(58) Field of Classification Search .................. 280/736, 280/741; 102/704
See application file for complete search history.

(56) References Cited

U.S. PATENT DOCUMENTS

| 3,305,319 | A | | 2/1967 | Kowalick et al. | |
|---|---|---|---|---|---|
| 3,810,655 | A | | 5/1974 | Prachar | |
| 3,813,007 | A | * | 5/1974 | Doin et al. | 222/4 |
| 3,934,984 | A | * | 1/1976 | Marlow et al. | 422/166 |
| 3,985,375 | A | * | 10/1976 | Lewis et al. | 280/737 |
| 5,268,013 | A | * | 12/1993 | Bruncher et al. | 55/486 |
| 5,487,561 | A | | 1/1996 | Mandzy et al. | |
| 5,624,134 | A | | 4/1997 | Iwai et al. | |
| 5,669,631 | A | | 9/1997 | Johnson et al. | |
| 6,076,468 | A | | 6/2000 | DiGiacomo et al. | |
| 6,095,559 | A | | 8/2000 | Smith et al. | |
| 6,279,948 | B1 | | 8/2001 | Rank | |
| 6,409,214 | B2 | | 6/2002 | Katsuda et al. | |
| 6,412,814 | B1 | | 7/2002 | Huber et al. | |
| 6,854,395 | B2 | | 2/2005 | Katsuda et al. | |
| 6,886,856 | B2 | | 5/2005 | Canterberry et al. | |
| 7,556,289 | B2 | * | 7/2009 | Katsuda et al. | 280/736 |
| 2004/0113405 | A1 | * | 6/2004 | Stricker et al. | 280/736 |

FOREIGN PATENT DOCUMENTS

| DE | 695 15 161 T2 | 6/1996 |
|---|---|---|
| DE | 196 02 695 | 7/1997 |
| DE | 196 12 581 A 1 | 10/1997 |
| DE | 197 26 276 | 12/1998 |
| DE | 199 13 145 A 1 | 2/2000 |

(Continued)

*Primary Examiner* — Paul N Dickson
*Assistant Examiner* — Nicole Verley
(74) *Attorney, Agent, or Firm* — Foley & Lardner LLP

(57) ABSTRACT

An airbag module for a motor vehicle includes a gas sack that can be inflated with gas to protect an occupant, a gas generator for generating the gas provided for inflating the gas sack, and an additional cooling device comprising an openable reservoir for storing a coolant. The reservoir is opened when the gas sack is inflated, so that the coolant for cooling the gas used to inflate the gas sack can come into contact with the gas. The cooling device comprises a movement generating device that opens the reservoir to release the coolant.

18 Claims, 7 Drawing Sheets

FOREIGN PATENT DOCUMENTS

| | | |
|---|---|---|
| DE | 199 13 145 A1 | 2/2000 |
| DE | 198 49 027 A1 | 4/2000 |
| DE | 198 49 027 A 1 | 4/2000 |
| DE | 103 61 887 A1 | 7/2005 |
| DE | 20 2005 016457 U1 | 2/2006 |
| EP | 0 978 424 A2 | 2/2000 |
| EP | 0 995 643 A2 | 4/2000 |
| FR | 2 902 060 | 12/2007 |
| WO | WO 2005/058654 A1 | 6/2005 |
| WO | WO 2007/045227 A1 | 4/2007 |
| WO | WO 2007/101644 A1 | 9/2007 |
| WO | WO 2007/141335 A1 | 12/2007 |

* cited by examiner

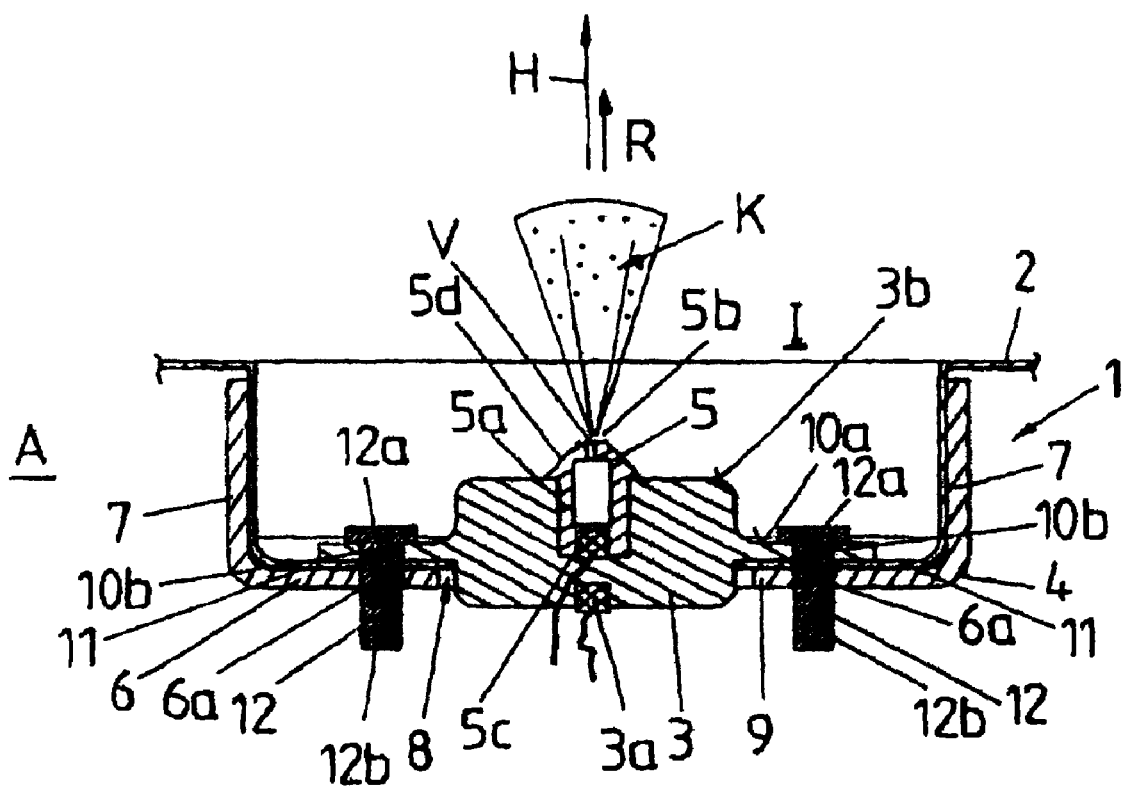

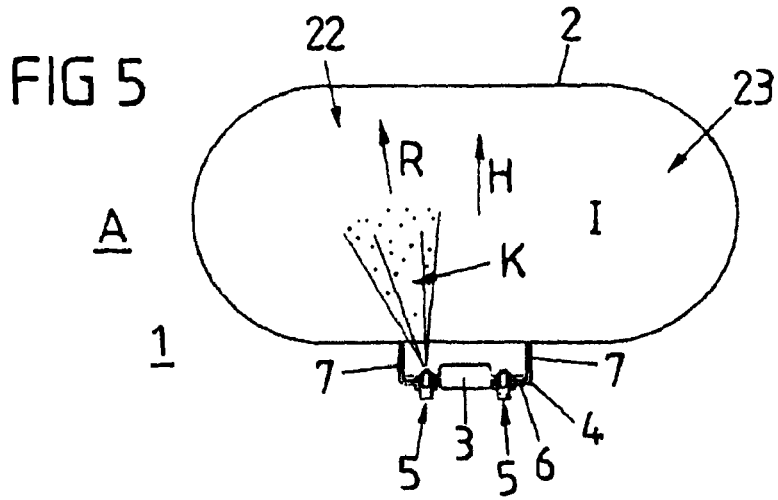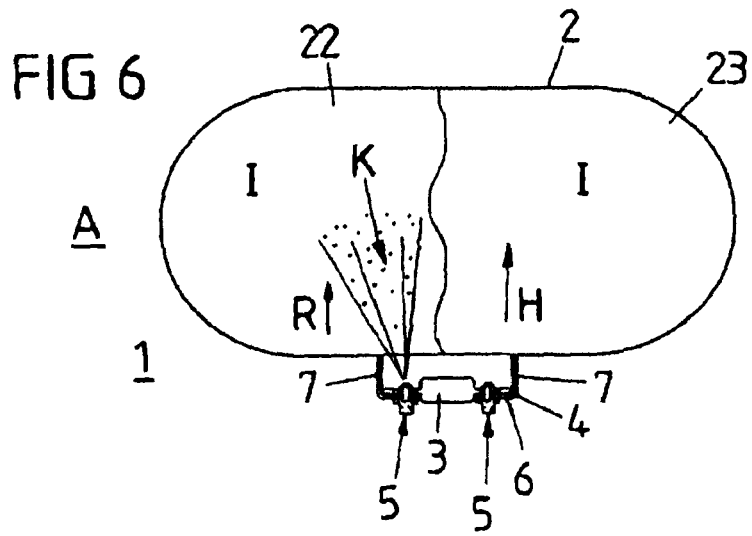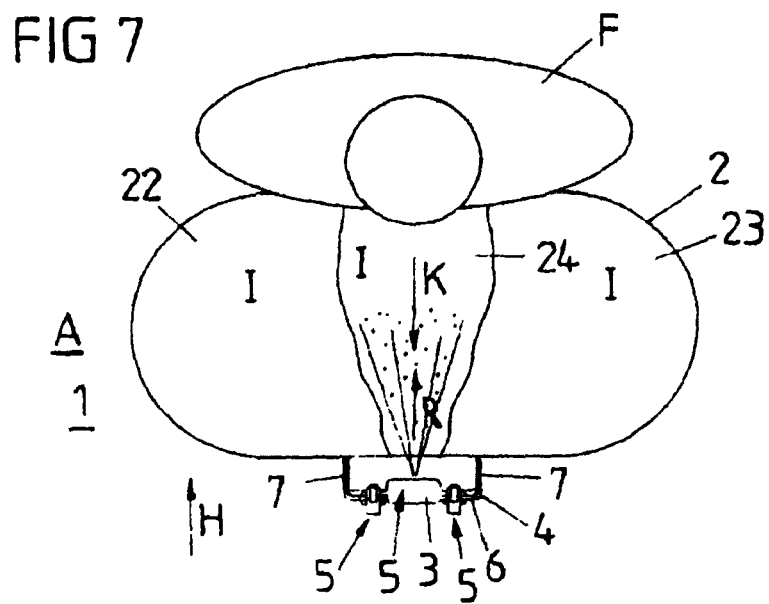

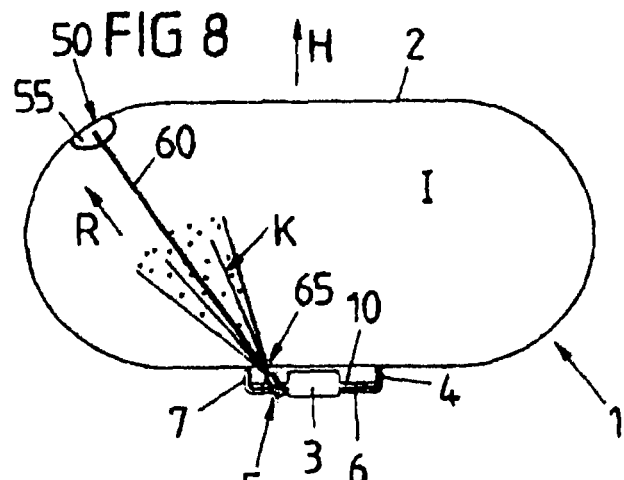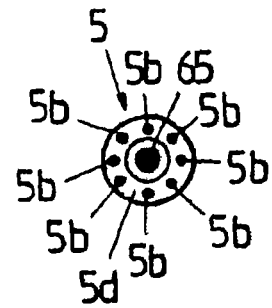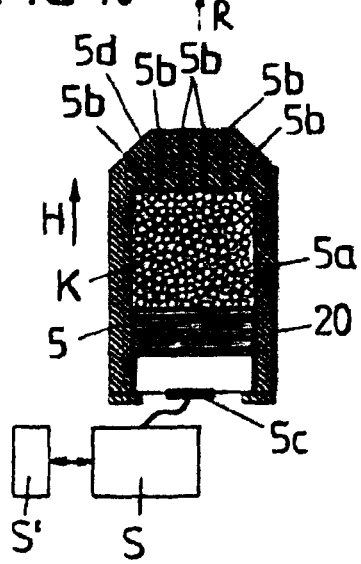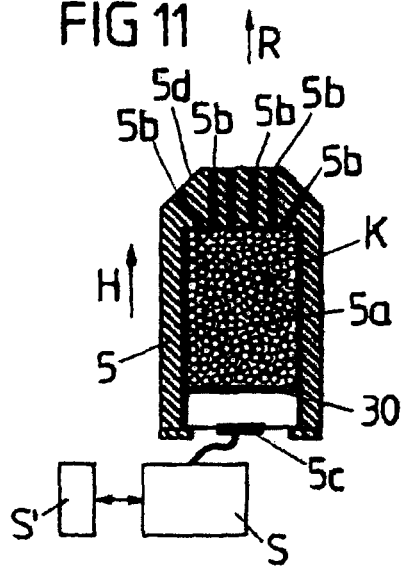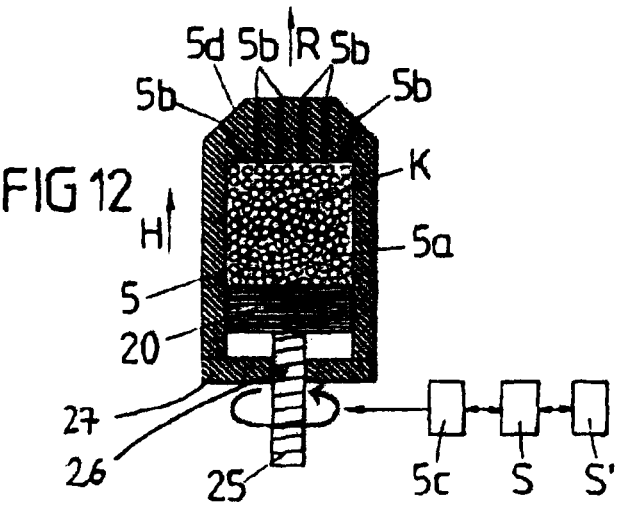

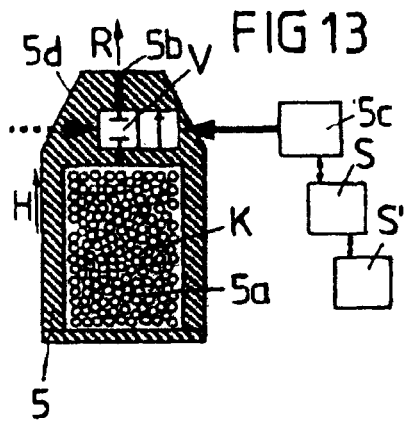
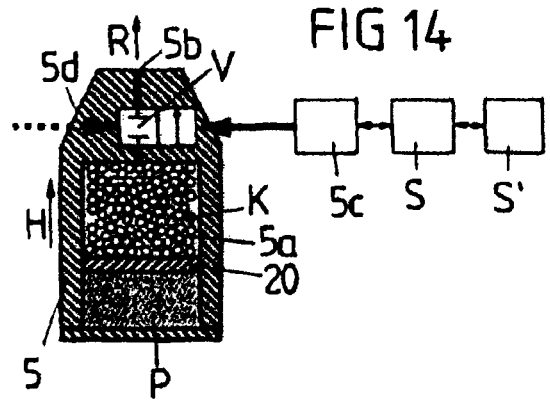
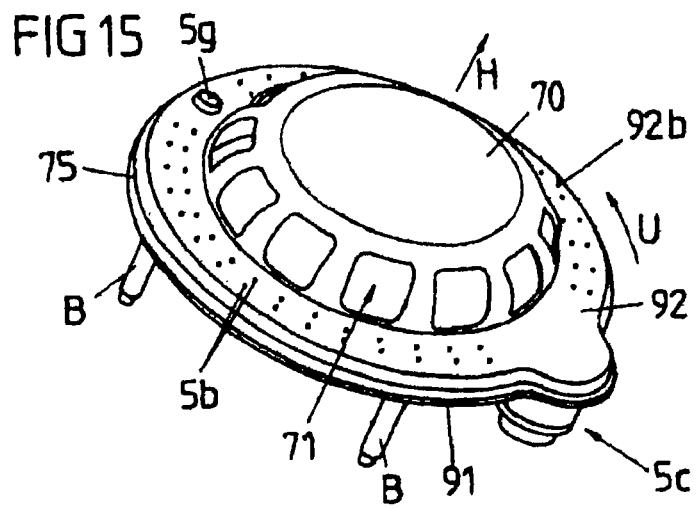
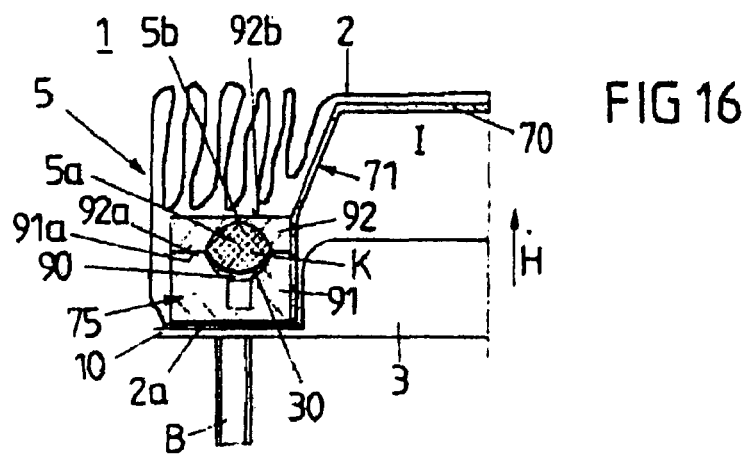

US 7,896,393 B2

AIRBAG MODULE

CROSS REFERENCE TO RELATED APPLICATIONS

This application is a Divisional of U.S. application Ser. No. 12/230,545, filed Aug. 29, 2008, which is a continuation of International Application PCT/EP2007/001872, which has an international filing date of Mar. 5, 2007; this International Application was not published in English, but was published in German as WO 2007/101644. The foregoing International application is incorporated herein by reference in its entirety.

BACKGROUND

The application relates to an airbag module for a motor vehicle. DE 196 02 695 C2 (incorporated by reference herein) discloses a gas generator having a cooling device that has a reservoir, for storing a cooling liquid, in the form of a cooling pouch made from a durable plastic film, that is damaged by hot gases provided by the gas generator and thereby releases the coolant contained therein to cool the gas generated by the gas generator.

It would be advantageous to provide a cooling device including a movement generating device that opens the reservoir to release the coolant with an improved adaptability to a person to be protected and a respective accident situation.

SUMMARY

One disclosed embodiment relates to an airbag module for a motor vehicle. The airbag module includes a gas sack that can be inflated with gas to protect an occupant, a gas generator for generating the gas provided for inflating the gas sack, and an additional cooling device comprising an openable reservoir for storing a coolant. The reservoir is opened when the gas sack is inflated, so that the coolant for cooling the gas used to inflate the gas sack can come into contact with the gas. The cooling device comprises a movement generating device that opens the reservoir to release the coolant.

Another embodiment relates to a method for restraining an occupant of a motor vehicle with an airbag module. The method includes inflating a gas sack of the airbag module to protect the occupant, and releasing a coolant into an interior space of the gas sack with a cooling device of the airbag module to reduce the temperature prevailing in the interior space of the gas sack during inflating. The time of the release of the coolant is calculated by an electronic control unit as a function of at least one parameter from a sensor unit assigned to the airbag module.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary

FIG. 4 shows a schematic, sectioned detail view of a further modification of the airbag module shown in FIGS. 1 to 3.

FIG. 5 shows a schematic sectioned view of a modification of the airbag module shown in FIGS. 1 and 2 with two separately actuable cooling devices, FIG. 6 shows a schematic sectioned view of a modification of the airbag module shown in FIG. 5, with the two cooling devices being assigned different chambers of the gas sack.

FIG. 7 shows a schematic sectioned view of a further modification of the airbag module shown in FIGS. 5 and 6, with three separately triggerable cooling devices that are each assigned one chamber of the gas sack.

FIG. 8 shows a schematic sectioned view of an airbag module of the type shown in FIGS. 1 and 2, with a cooling device that opens a discharge opening of the gas sack.

FIG. 9 shows a plan view of a cooling device of the type shown in FIG. 8, with a central nozzle for opening the discharge opening of the gas sack.

FIG. 10 shows a schematic sectioned illustration of an embodiment of a cooling device for an airbag module for reducing the gas internal pressure of a gas sack, with a piston for releasing a coolant driven by a pyrotechnic movement generating device.

FIG. 11 shows a schematic sectioned illustration of a modification of the cooling device shown in FIG. 10, with the coolant being acted on with a gas via a diaphragm.

FIG. 12 shows a schematic sectioned illustration of a modification of the cooling device shown in FIG. 10, where the piston for pressurizing the coolant is mounted in the reservoir by a rotatable threaded bar.

FIG. 13 shows a schematic sectioned illustration of a further embodiment of a cooling device for reducing the gas internal pressure of a gas sack including a pressurized coolant.

FIG. 14 shows a schematic sectioned illustration of a modification of the cooling device shown in FIG. 13 in which the coolant is pressurized by a gas cushion provided in the reservoir.

FIG. 15 shows a perspective view of a cooling device that is integrated into a diffuser.

FIG. 16 shows a sectioned detail view of the diffuser shown in FIG. 15, before the triggering of the cooling device.

DESCRIPTION

Figure 1:
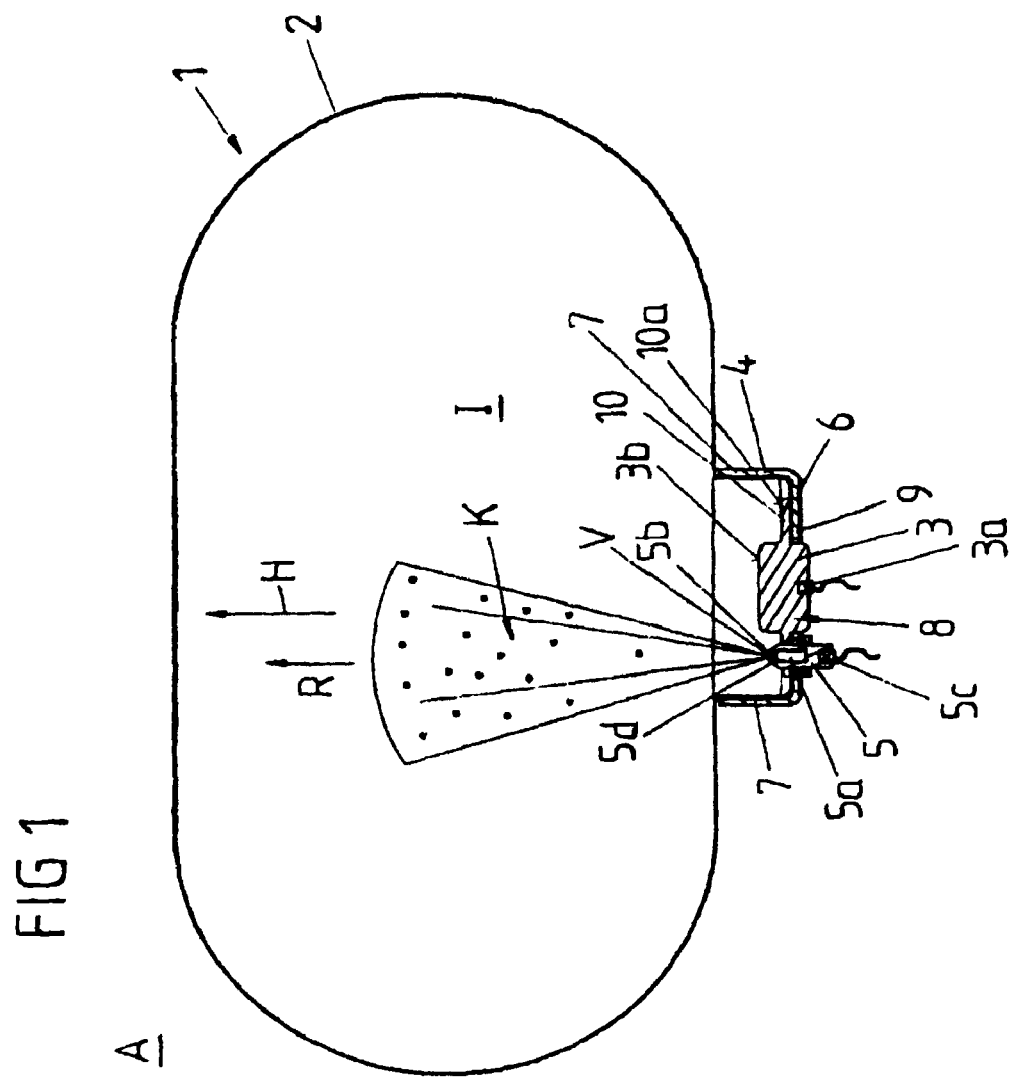
FIG. 1 shows a schematic sectioned view of an airbag module having a cooling device.

It is possible for the temperature of the gas situated in the gas sack to be influenced by of the cooling device irrespective of the time of activation of the gas generator. Since the pressure prevailing in the gas sack is proportional to the temperature of the gas situated in the gas sack, it is thereby possible for the gas sack to be adapted to a person to be protected or to a specific accident situation. It is thereby possible in certain scenarios, such as in a minor accident or a light person such as a 5% woman, for the cooling of the gas used to inflate the gas sack to take place relatively early so that the gas sack is inflated less intensely. In the event of a particularly heavy accident or a very heavy person (50% to 95% man) it is possible for a cooling of the gas to take place correspondingly late or not at all, so that the gas sack is inflated to be correspondingly firm.

In a collision event, an out of position situation may occur, such as when an occupant to be protected by the gas sack is not sufficiently remote from the gas sack in a main unfolding direction along which the gas sack moves towards the occupant during unfolding. In such a situation, it is also possible for the cooling of the gas situated in the gas sack to take place early, so that the gas sack has a relatively low pressure corresponding to the small spacing between the occupant and the gas sack to reduce the chance of an occupant being injured during unfolding.

The movement generating device preferably opens the reservoir at a predefinable time, with the time being calculated by an electronic control unit as a function of at least one parameter that can be detected by a sensor unit. The parameter can, for example, be the mass of the occupant to be protected by the gas sack, a deceleration of the vehicle caused by an accident, a relative speed between the motor vehicle and a collision object that is colliding with the motor vehicle, or a spacing between the gas sack and an occupant in the main unfolding direction of the gas sack (e.g., the spatial position of the occupant in the motor vehicle). It is also possible for the electronic control unit to evaluate a selection of the above parameters to determine a time of the activation of the cooling device.

The cooling device preferably opens a closure of an outflow opening of the reservoir with the movement generating device. The coolant can pass through the open outflow opening into an interior space of the gas sack. The outflow opening is preferably arranged in the interior space of the gas sack. It is thereby advantageously possible for the coolant to distribute over a large volume in the interior space, and to provide correspondingly effective cooling of the gas situated in the interior space of the gas sack within a very short time.

Before the release of the coolant, the outflow opening is closed off by the closure. To open the closure, the movement generating device preferably provides a pressure that acts on the closure.

In an alternative embodiment, the closure is formed in one piece with the reservoir, with it being possible for predetermined breaking points to be provided on the outflow opening that is closed off by the closure, so that the closure can be reproducibly detached from the reservoir by being acted on with pressure. Alternatively, the closure is preferably adhesively bonded or welded to the outflow opening. The closure is preferably embodied here as a film that covers the outflow opening that can be formed to be self-adherent to close off the outflow opening. Alternatively, the film for closing off the outflow opening can be melted with an edge region of the outflow opening. In another exemplary embodiment, the closure is embodied as a reversibly (non-destructively) openable valve.

The cooling device preferably provides an overpressure in the reservoir that causes a release of coolant through the outflow opening of the reservoir when the outflow opening is open. Such an overpressure can, for example, be generated pyrotechnically or by a motor-driven punch that presses against the coolant and thereby increases the pressure prevailing in the reservoir. The increased pressure in the reservoir facilitates the releasing of the coolant and, if appropriate, the opening of the closure.

In addition, the cooling device preferably provides the overpressure for releasing the coolant at a predefinable time in the reservoir, with the time being calculated by the electronic control unit as a function of a selection of the above parameters.

The movement generating device preferably provides an overpressure in the reservoir that both opens the closure of the outflow opening (to release the coolant) and also presses the coolant through the outflow opening and out of the reservoir. A permanent overpressure may also prevail in the reservoir. In this case, the movement generating device can serve merely for the (controllable) opening of the closure of the outflow opening of the reservoir. Here, the movement generating device can also be mechanically coupled to the closure to open the closure.

The cooling device preferably releases a predeterminable and variable quantity of coolant per unit time. The quantity of coolant to be released into the interior space of the gas sack per unit time can be calculated by an electronic control unit that, during a collision, continuously evaluates occupant-related parameters (e.g., the size of the occupant to be protected, the mass of the occupant or the position of the occupant in relation to the unfolding gas sack, etc.) or vehicle-related parameters (e.g., speed of the motor vehicle, relative speed with respect to the collision partner, deceleration of the motor vehicle during the collision, etc.) that are detected by a sensor unit. The electronic control unit converts the parameters into corresponding values for the coolant quantity to be released per unit time. The time profile of the quantity of coolant released into the gas sack per unit time is therefore controllable in real-time. The pressure that the cooling device exerts on the coolant can serve as the variable to be controlled. According to one exemplary embodiment, The outlet has an area aligned perpendicular to an outflow direction of the coolant, through which the coolant flows as it passes out of the reservoir, that is constant. In the case of a constant outlet cross section, the coolant quantity released per unit time rises with increasing pressure. It is conversely possible, in the case of an approximately constant pressure, for the quantity of coolant to be released per unit time to be regulated by varying the outlet cross section.

In the case of a liquid coolant, the droplet size can serve as a further adjusting variable for controlling the cooling action of the cooling device. The cooling effect is provided more quickly in the case of comparatively finely sprayed coolant (small droplets), on account of the relatively large effective surface of the coolant, than in the case of comparatively large droplets. The same applies to solid coolant (powder and foams). The droplet size can be influenced in particular by the shape of the outflow opening, in particular the outlet cross section thereof, and by varying the pressure that the coolant is under.

The above-described regulating mechanisms can of course also be combined with one another.

In an alternative embodiment, the coolant contained in the reservoir is under a permanent pressure (that decreases when the outflow opening is opened) such that, when the closure of the outflow opening is opened, the coolant is released into the interior space of the gas sack. Once released into the interior space of the gas sack, the coolant cools the gases introduced into the gas sack during inflating and reduces the pressure of the gases.

The coolant itself can be under pressure or a gas cushion in the reservoir may act (constantly) on the coolant via a piston to pressurize the coolant.

If the coolant is pressurized, the quantity of coolant passing out of the reservoir per time interval is preferably controlled by an actuation of the closure of the outflow opening, (e.g., by a time-dependent variation of the effective outlet cross section of the outflow opening). The closure of the outflow opening (as an element of a valve unit) is preferably moveable in a reciprocating fashion between a first and a second position, with the outflow opening being closed in the first position of the closure, and allowing a maximum quantity of coolant to pass through per unit time in the second position. The closure can preferably be arranged in at least one intermediate position that is situated between the first and second positions, so that the outflow opening can be opened and closed in a stepped fashion. A continuous movement of the closure can preferably be performed via any desired number of lockable intermediate positions, so that the size of the outlet cross section can be controlled precisely in a continuously variable fashion. A movement between two positions, (e.g., between two different intermediate positions) is brought about by the movement generating device.

In a further exemplary embodiment, the coolant is released after being acted upon by a gas that is generated pyrotechnically by the movement generating device (gas generator).

The coolant is preferably enclosed in a diaphragm that, before being acted on with gas, simultaneously functions as a closure of the outflow opening by sealingly enclosing the coolant and thereby preventing the coolant from passing out through the outflow opening of the reservoir. The diaphragm is configured to be destroyed when acted upon by the impulse exerted by the gas or by the inner energy of the gas, so that the overpressure (in relation to the pressure prevailing in the gas sack) provided in the reservoir by the generated gas causes a release (outflow) of the coolant through the outflow opening of the reservoir.

Instead of a diaphragm, a piston moveable in the reservoir may transmit the gas pressure to the coolant. The piston is acted on with a gas and moves from a first position into a second position, with the second position corresponding to a volume of the reservoir that is reduced in size in relation to the first position (e.g., the coolant is pressed out of the reservoir by the piston).

In a further embodiment, the movement of the piston from the first into the second position is provided not by a pyrotechnic device but rather by a movement generating device, such as a motor that drives a rotatable threaded bar. The piston is mounted to the threaded bar in the reservoir, so that the piston can, with a correspondingly directed rotation of the threaded bar, be moved continuously in a reciprocating fashion between a first position and a second position. The coolant is pressurized by compression as the piston moves into the second position. In such a cooling device, it is possible to use both an irreversible closure (that can be opened by being destroyed) and also a reversible closure (that can be moved in a reciprocating fashion between two positions) of the outflow opening.

The movement generating device preferably interacts with an electronic control unit that triggers the movement generating device at a predeterminable time as a function of at least one parameter that can be sensed by a sensor unit. The sensing of the parameter and the calculation of the variable to be controlled (e.g., pressure of the coolant as a function of the time, time of opening of the closure relative to the time of activation of the gas sack, time duration during which the closure is open, outlet cross section of the outflow opening as a function of the time, droplet or particle size of the coolant to be released, etc.) is preferably carried out in real-time during the collision or during the inflating of the gas sack.

The coolant is preferably capable of flowing as it passes through the outflow opening. In one alternative embodiment, the outflow opening configured to atomize the liquid coolant into a plurality of droplets as it flows out of the outflow opening into the interior space of the gas sack. The coolant is preferably introduced into the interior space of the gas sack along an outflow direction that points toward the interior space. The outflow direction preferably runs along a main unfolding direction of the gas sack, along which an inflating gas sack moves toward an occupant to be protected. This ensures a particularly fast distribution of the coolant in the interior space of the gas sack.

The coolant is preferably vaporized by the heat of the gas that is to be cooled. It is possible here to obtain particularly effective cooling of the gas for inflating that is provided by the gas generator since the transition of the coolant from the liquid into the gaseous phase constitutes a phase transition of the first type, in which the heat of the hot gas that is introduced into the interior space of the gas sack serves to drive the phase transition. The available heat of the hot gas at least partially causes the phase conversion of the coolant. The reservoir together with the outflow opening projects at least in sections into the interior space of the gas sack so that the coolant can be effectively distributed in the interior space of the unfolding gas sack by the cooling device.

However, the coolant need not strictly be in a purely liquid state of aggregation as it is introduced into the gas sack. In an alternative variant, the coolant is in a solid state of aggregation (for example powder or foam) when released, and is preferably finely atomized by the cooling device when released, with it being possible for the degree of fineness (e.g., the droplet size of a liquid coolant) to be controlled by the cooling device. In addition, the coolant can also be in a gaseous state of aggregation when released. In a further alternative embodiment, the coolant is a mixture that can contain gaseous, liquid and/or solid substances.

In a further exemplary embodiment, in addition to the time-dependently controllable cooling of the gas used to inflate the gas sack, a discharge opening on the gas sack is provided, through which, in an open state, gas can be discharged out of the gas sack. Before the inflation of the gas sack or before the activation of the cooling device, the discharge opening is closed off by a diaphragm that is destroyed by the action of the coolant. Here, the diaphragm can be destroyed (decomposed) by a mechanical action of the coolant and/or by a chemical action of the coolant on the diaphragm.

In one embodiment, at least a part of the coolant is introduced into the gas sack as a jet that is directed at the diaphragm. The cooling device preferably has an additional nozzle that shapes the jet and can be formed on the reservoir adjacent to the outflow opening of the reservoir. If a plurality of outflow openings is provided, these can be arranged concentric to the (central) nozzle. The gas generator preferably has a flange for fastening the gas generator to a generator support of the airbag module. The flange preferably protrudes from the gas generator and at least partially encircles the gas generator. The generator support preferably forms a receptacle for the gas sack in a folded state having an openable cover that faces toward the driver (or another occupant) when the airbag module is installed in a motor vehicle. The gas sack can unfold through the cover into an exterior space that surrounds the airbag module. The cover may have tear-off lines along which the cover tears off when, as a result of the gas being introduced into the gas sack, the gas sack expands along its main unfolding direction and presses against the cover.

A base of the generator support extends transversely with respect to the main unfolding direction of the gas sack. The base is preferably situated opposite the cover of the generator support along the main unfolding direction of the gas sack.

The base is connected to the cover by a wall that extends from the base of the generator support.

The base preferably has a central gas generator opening that receives the gas generator, with the gas generator opening having an encircling edge region that is coupled to the flange of the gas generator.

The gas sack preferably has an inflow opening for introducing gas into the interior space of the gas sack, with an edge region that encircles the inflow opening and fixes the gas sack to the generator support. The edge region of the gas sack is clamped between the edge region of the generator opening and the flange of the gas generator. The gas generator projects along the main unfolding direction of the gas sack, through the inflow opening of the gas sack, into the interior space of the gas sack.

The flange is preferably connected to the base of the gas generator with at least one connecting element (e.g., a screw, a rivet, or a similar fastening mechanism) that extends longitudinally along a direction of extent. The flange preferably has at least one first continuous cut-out that is aligned with a second continuous cut-out that is formed at the edge region of the gas generator opening of the generator support. The connecting element is guided through the two aligned cut-outs of the flange and of the base of the generator support, and is suitably fixed there so that a connection is produced between the flange and the base of the generator support.

In an exemplary embodiment, the flange has at least one first continuous recess, with the gas generator bearing with its flange on the edge region of the gas generator opening such that the first continuous recess of the flange comes to rest on a second continuous recess of the edge region of the gas generator opening.

The reservoir of the cooling device is preferably inserted into the two recesses such that the flange and the base of the generator support encloses the reservoir in cross section.

In an alternative embodiment, the outflow opening of the reservoir of the cooling device is formed by a passage opening of the connecting element. The outflow opening is aligned with the direction of extent of the connecting element. The connecting element guided through the two aligned cut-outs of the flange and of the base of the generator support serves as a nozzle of the cooling device through which the coolant can pass out of the reservoir. The connecting element includes an openable closure of the above-described type, into the interior space of the gas sack. The reservoir is preferably connected to the connecting element at an outer side of the base of the generator support that faces away from the interior space. A thread can be provided on a free end region of the connecting element that projects into the exterior space of the airbag module. The thread on the connecting element engages a corresponding thread on the reservoir. In addition, the reservoir can also be connected to the connecting element with a plug-type connection. It is also possible for the reservoir to be adhesively bonded or welded to the connecting element. This variant of the cooling device is advantageous because it makes it particularly simple for an airbag module to be retrofitted with a cooling device. It is merely necessary for the one connecting element (or one of a plurality of connecting elements) to be removed from their installed position and to be exchanged for a connecting element provided with the passage opening.

In a further exemplary embodiment, the reservoir is spaced apart from the other components of the airbag module in a motor vehicle, with the movement generating device being integrated into the reservoir. An inflow line connects the reservoir to a connecting element with an outflow opening so that the coolant can pass via the inflow line into the gas sack. The inflow line is arranged in the interior space of the gas sack or in the interior space of the airbag module.

In an alternative exemplary embodiment, the cooling device is integrated into the gas generator. The cooling device is preferably arranged centrally in an upper side of the gas generator facing towards the interior space such that the reservoir of the cooling device is surrounded at least in sections by the gas generator. The outflow opening of the reservoir faces toward the interior space of the gas sack along the main unfolding direction. This advantageously provides a symmetrical design of the cooling-device/gas-generator unit that ensures spatially highly uniform cooling of the gas situated in the gas sack.

The airbag module preferably has a diffuser for distributing the gases used by the gas generator to inflate the gas sack. The diffuser projects through an inflow opening of the gas sack into the interior space of the gas sack and preferably serves to clamp an edge region of the gas sack to a part of the airbag module. The part can in particular be a flange of the gas generator or a generator support.

The diffuser has a flange that annularly encircles the diffuser in a peripheral direction aligned in particular transversely with respect to the main unfolding direction of the gas sack. The flange helps to couple the diffuser to the airbag module and to clamp the gas sack to the airbag module. According to one embodiment, the reservoir is of (open) annular design and can preferably be detachably fastened to the diffuser, with the reservoir encircling on the flange of the diffuser along the peripheral direction of the flange.

The annular reservoir has a first end section on which a plurality of outflow openings for releasing the coolant are formed on an upper side that faces toward an interior space of the gas sack of the reservoir and a second end section that is situated opposite the first end section along the peripheral direction.

A piston for releasing the coolant is mounted in the second end section of the reservoir, with the piston being moveable along the peripheral direction. The piston is moveable from a first to a second position in which the piston is arranged closer to the first end section of the reservoir along the peripheral direction. The coolant that is stored in the reservoir can therefore be pressed out of the reservoir by a movement of the piston from the first into the second position. The drive of the piston is preferably provided by a pyrotechnic movement generating device that acts on the piston with gas to move the piston from the first into the second position.

In one alternative embodiment, the cooling device that is provided on the diffuser has a pressure chamber that interacts with the reservoir. The cooling device adjoins and extends along the reservoir and can be filled with gas to pressurize the coolant. The pressure chamber and the reservoir are preferably separated from one another by a diaphragm so that a pressure increase in the pressure chamber can be transmitted via the diaphragm to the coolant situated in the reservoir. The diaphragm may be acted upon by a gas and be moved from a first position into a second position, with the diaphragm pressing the coolant that is situated in the reservoir out of the reservoir during the movement from the first into the second position. Alternatively, the diaphragm can be destroyed so that the coolant is acted on directly by the gases. The coolant passes out of the reservoir through the outflow openings that are preferably distributed uniformly along the peripheral direction on an upper side of the reservoir facing toward the interior space of the gas sack.

In one alternative embodiment, the reservoir and/or the pressure chamber are formed in one piece with the flange of the diffuser.

Alternatively, the cooling device can form a separate sub-module that can be fastened to the diffuser, so that a conventional diffuser can be retrofitted with a cooling device as described herein. The sub-module may comprise at least the reservoir, if appropriate the pressure chamber that is connected via the diaphragm to the reservoir, and the movement generating device (if appropriate with piston). In addition, the sub-module can also contain the electronic control unit for actuating the cooling device. The sub-module may be coupled to the (vehicle-side) sensor unit with any suitable mechanism.

A further embodiment provides that a plurality of cooling devices are provided. The cooling devices each include a reservoir for storing a coolant, with the respective reservoir opening when the gas sack is inflated, so that the coolant for cooling the gas used to inflate the gas sack can come into contact with the gas.

When using pyrotechnic movement generating devices for acting on the coolant with a plurality of cooling devices, there is also the possibility of controlling the time profile of the cooling in a relatively simple way (e.g., by activating the individual cooling devices at defined (different) times to release coolants). It is possible for the overall quantity of the coolant released per unit time to be varied in that the individual cooling devices release a different quantity of coolant. For example, different quantities of coolants may be stored in the individual reservoirs, or a different number of cooling devices may be activated.

In addition, the use of a plurality of cooling devices permits time-differentiated and space-differentiated cooling of the gas situated in the gas sack. The cooling devices are preferably assigned different regions of the gas sack. The region can also be a separate gas sack chamber of the gas sack. This makes it possible to adapt the gas sack internal pressure in a targeted fashion. It is thereby possible for the gas sack internal pressure prevailing in a central gas sack chamber, that forms an impact face for a head of an occupant, to be reduced in a targeted fashion to reduce the risk of injury to the occupant in the facial region, while the gas sack chambers surrounding the central gas sack chamber can be inflated to be considerably firmer to support the central gas sack chamber.

The individual cooling devices preferably interact with an electronic control unit that activates the individual cooling devices separately (e.g., one after the other in time) to release coolants as a function of at least one parameter that can be sensed by a sensor unit (e.g., size, mass, position of the occupant to be protected; speed, relative speed, deceleration of the motor vehicle during a collision, etc.).

It is preferable to reduce the gas sack internal pressure, for between 0.05 g and 0.15 g of coolant per liter gas sack volume to be introduced into the gas sack. This provides a pressure reduction in the region of 10 kPa. Reducing the internal pressure facilitates the cooling of the gas introduced into the gas sack when the gas sack is inflated.

The cooling device can also be used in combination with further devices that likewise serve to adapt the gas sack to different crash conditions, for example by controlling the gas pressure prevailing in the gas sack. Such devices can for example be controllable discharge openings that can be opened as a function of the respective accident situation, so that gas can escape from the gas sack into an exterior space that surrounds the airbag module. The time of opening and if appropriate the time duration of the open state of a discharge opening can be calculated by suitable control electronics as a function of a selection of the above described parameters. It is of course also possible for gas supply lines, that serve to introduce gas into the gas sack, to additionally be controllable (for example closable).

According to one exemplary embodiment, a method for restraining an occupant of a motor vehicle by an airbag module comprises inflating a gas sack of the airbag module to protect the occupant from collision-related forces, detecting at least one occupant-related or vehicle-related parameter with a sensor unit, and releasing a coolant from an additional cooling device of the airbag module to reduce a pressure prevailing in the gas sack during inflating. The time of the release of the coolant is calculated by an electronic control unit as a function of at least one parameter. The parameters define the position and/or the variation with time of the position of the occupant to be protected or of a vehicle that is involved in the collision and are obtained by the sensor unit.

The release of the coolant can take place at any desired time, in particular also when a gas sack is only partially inflated.

The at least one parameter is preferably detected during a collision, with the time preferably being calculated during the collision (as the gas sack is inflated) in real-time. Alternatively or in addition to this, the at least one parameter can be detected before the collision by a pre-crash sensor arrangement (sensor arrangement for detecting impending collisions). Times or profiles for the activation of the cooling device can then be calculated by a control unit before the collision or read out from a memory of the control unit.

If further control variables (such as for example the pressure of the coolant or the outlet cross section of the outflow openings of a reservoir) of the cooling device are controlled during the inflating of the gas sack, the at least one parameter is sensed multiple times during a collision, so that the time profile of the control variables can be adapted to the present value of the at least one parameter or controlled corresponding to the present value. The parameter can likewise be calculated multiple times already before the collision.

A plurality of the above-stated occupant-related and/or vehicle-related parameters can be detected by the sensor unit (or a plurality of sensor units).

The coolant is preferably introduced into the gas sack during a timespan with a duration that is calculated by the electronic control unit, preferably before or during the collision, as a function of at least one parameter that is detected by the sensor unit.

To be able to adapt the time profile of the pressure prevailing in the gas sack precisely to the respective accident situation, a variable quantity of coolant is released per unit time, with the quantity of coolant that is introduced into the gas sack per unit time being calculated by the control unit, preferably before or during the collision, as a function of the at least one parameter.

The coolant is preferably, to control the quantity of coolant to be released per unit time, subjected to a variable pressure. In the case of a high pressure, a larger quantity passes out of the reservoir per unit time when the outflow openings are open than at a comparatively low pressure. The magnitude of the pressure applied to the coolant is calculated by the control unit, preferably before or during the collision, as a function of the at least one parameter.

One variant of the disclosed method provides that the coolant is fragmented into individual particles of predeterminable volume when released, with the (average) volume of the particles to be set being calculated by the control unit, preferably before or during the collision, as a function of at least one parameter. If the cooling device sets the particle volume by varying the outlet cross section of the at least one outflow opening, the control unit converts the parameter into an outlet cross section, to be set, of the at least one outflow opening.

A particle is to be understood here to mean a unit of coolant (droplet, grain, etc) that coheres when the coolant is released.

In another variant of the method, it is provided that, to reduce the pressure prevailing in the gas sack during inflating, a plurality of cooling devices are activated, with a predeterminable coolant quantity being introduced into the gas sack at a predeterminable time by each of the cooling devices. The respective times of the release of the coolant relative to the start of unfolding of the gas sack are preferably calculated here by the electronic control unit, preferably before or during the course of the accident (for example collision), as a function of the at least one parameter. The parameter is if appropriate detected by a sensor unit multiple times during the course of the accident or during the inflating of the gas sack.

In a further embodiment of the method, it is provided that the at least one cooling device is actuated as a function of at least one additional restraint device, in particular as a function of a belt force limiter for limiting the crash-related forces introduced into an occupant by a belt in the event of a crash. A sensor unit can detect belt-specific parameters (belt extraction, speed of belt extraction), with an electronic control unit using parameters for controlling the cooling device. It is thus for example possible, in the event of an already comparatively large belt extraction at the time of activation of the gas sack, to conclude that the occupant is positioned too close to the gas sack. The electronic control device classifies the belt elongation and to initiate cooling of the gases situated in the gas sack by triggering the cooling device at a correspondingly early time.

Figure 2:
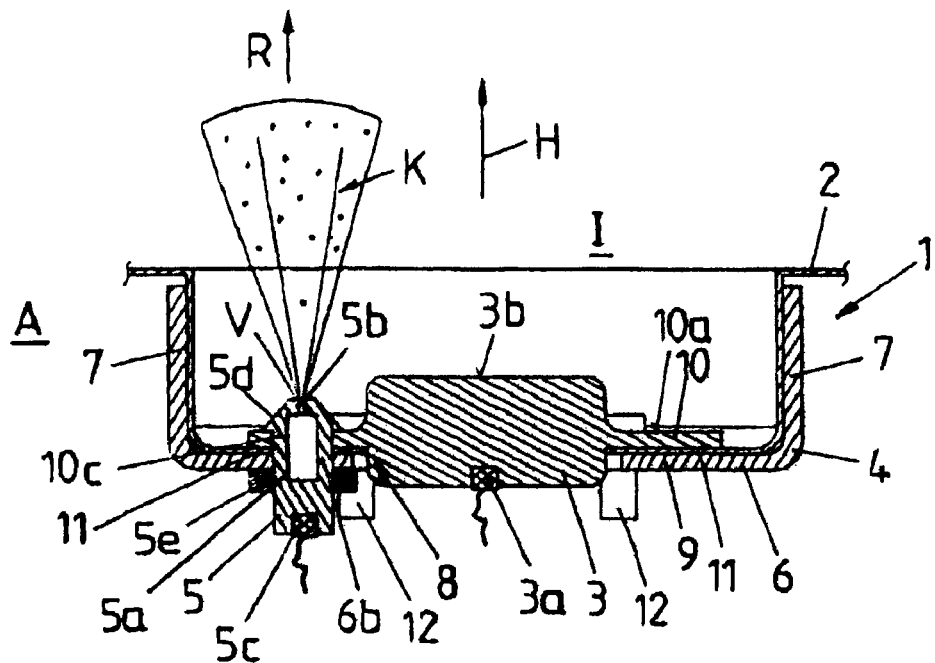
FIG. 2 shows a schematic sectioned view of a detail of the airbag module shown in FIG. 1.

FIGS. 1 and 2 show schematic sectioned views of an airbag module 1 that has a gas sack 2 that can be inflated to protect a person, and a gas generator 3 that provides the gas required to inflate the gas sack 2. The gas generator 3 has an igniter 3a that can be actuated by vehicle-side control electronics. The gas sack 2 and the gas generator 3 of the airbag module 1 are fixed to a generator support 4 together with a cooling device 5 that is arranged adjacent to the gas generator 3 and cools the gas used to inflate the gas sack 2. The airbag module 1 shown in FIG. 1 and FIG. 2 is an airbag module 1 for assembly in the steering wheel of a motor vehicle. With corresponding design of the individual components, however, the airbag module 1 may also be arranged at another point on the motor vehicle and used to protect an occupant (e.g., a vehicle dashboard, a side column, a seat cushion, etc.). The section plane of the airbag module 1 shown in FIG. 1 runs parallel to a steering axis of the steering wheel (not shown).

The generator support 4 has a cover through which the gas sack 2, that is illustrated in FIG. 1 in an inflated state, can unfold into an exterior space A that surrounds the airbag module 1, specifically along a main unfolding direction H that runs parallel to the steering axis. A base 6 of the generator support 4 is situated opposite the cover of the generator support 4 counter to the main unfolding direction H. The base 6 is connected to the cover (not shown) of the generator support 4 by a wall 7 that projects from the base 6 along the main unfolding direction H. The base 6 has a central, continuous gas generator opening 8, with an encircling edge region 9 that borders the gas generator opening 8 and on which a flange 10 of the gas generator 3 bears. The flange 10 encircles the gas generator 3 transversely with respect to the main unfolding direction H and fastens the gas generator 3 to the edge region 9 of the gas generator opening 8. The flange 10 is formed here to be of planar annular design, so that it contacts the edge region 9 of the gas generator opening 8.

The gas sack 2 has an inflow opening through which gas can be conducted into an interior space I of the gas sack 2 to inflate the gas sack 2. To fix the gas sack 2 to an inner side of the base 6 of the generator support 4 that faces toward the gas sack 2, an encircling edge region 11 of the inflow opening of the gas sack 2 is clamped along the main unfolding direction H between the edge region 9 of the gas generator opening 8 and the flange 10 of the gas generator 3. In this way, the gas generator 3 projects into the interior space I of the gas sack 2 along the main unfolding direction H through the inflow opening of the gas sack 2.

The flange 10 is connected to the edge region 9 of the gas generator opening 8 by longitudinally extending connecting elements 12. First cut-outs 10b are provided on the flange 10 and second cut-outs 6a are provided on the edge region 9 of the gas generator opening 8. The cut-outs 6a are aligned with one of the first cut-outs 10b, with the connecting elements 12 being inserted into the aligned first and second cut-outs 10b, 6a to extend longitudinally along the main unfolding direction H.

The longitudinally extending connecting elements 12 have a widened head 12a that bears on the inner side 10a, that faces towards the gas sack 2, of the flange 10, and specifically on an edge region of the inner side 10a that borders the respective first cut-out 10b. Proceeding from an outer side of the base 6 that faces away from the gas sack 2, the free end regions of the connecting elements 12 that project away from the base 6 can be coupled to nuts, so that a stable connection is produced between the gas generator 3 and the generator support 4. The flange 10 of the gas generator 3 is pressed against the edge region 9 of the gas generator opening 8 along the main unfolding direction H, with the edge region 11 of the inflow opening of the gas sack 2 being clamped between the flange 10 and the edge region 9 of the gas generator opening 8. Alternatively, the connecting elements 12 can also be embodied as rivets or can be fixed to the outer side of the base 6 that faces away from the gas sack 2.

The cooling device 5 comprises a reservoir 5a for storing a liquid coolant K that can pass through an outflow opening 5b into the interior space I of the gas sack 2. The outflow opening 5b is formed here in the manner of a nozzle, so that the coolant K is atomized or fractioned into small droplets as it is introduced from the reservoir 5a through the outflow opening 5b into the interior space I of the gas sack 2. To press the coolant K out of the reservoir 5a of the cooling device 5, the cooling device has a movement generating device 5c that can be activated by vehicle-side control electronics. The movement generating device 5c provides an overpressure in the reservoir 5a that presses the coolant K against a closure V of the outflow opening 5b. The closure V is opened by the overpressure provided in the reservoir 5a by the movement generating device 5c, so that the coolant K is released through the outflow opening 5b into the interior space I of the gas sack 2 along the outflow direction R. The closure V of the outflow opening 5b can be formed here in one piece with the reservoir 5a of the cooling device 5, and tear open as a result of the overpressure. It is likewise possible for a reversibly openable and closable valve to be used as a closure V of the outflow opening 5b. The valve can be actuated independently of the movement generating device 5c to open the outflow opening 5b. It is essential that the activation of the cooling device 5 can take place completely independently of the activation of the gas generator 3. Here, a time of activation of the cooling device 5 can be calculated by a suitable electronic control unit as a function of a specific accident situation. In the case of a reversibly openable and closable closure V of the outflow opening 5b, it is likewise conceivable that, to meter the coolant K with the electronic control unit, a timespan is calculated during which the coolant K is released through the outflow opening 5b into the interior space I of the gas sack 2. An overpressure in the reservoir 5a that conveys the coolant K into the interior space I of the gas sack 2, can be provided by a reversibly operating movement generating device, for example by a motor-driven punch that presses against the liquid coolant K along the outflow direction R.

Since, for a constant volume, the pressure of the gas situated in the gas sack 2 is proportional to the temperature of the gas, the cooling causes a reduction of the gas pressure prevailing in the gas sack 2. The gas sack 2 can be adapted to a specific accident situation with the controllable cooling of the gas situated in the gas sack 2. Early cooling of the gas (reduction of the gas pressure) can for example take place if a driver is at too small a distance from the gas sack (out of position) along the main unfolding direction H of the gas sack 2.

A first recess 10c is provided on the flange 10 of the gas generator 3 and a second recess 6b is provided on the edge region 9 of the gas generator opening 8 to fasten the cooling device 5 to the airbag module 1. The recesses are substantially congruent and aligned with one another. The cooling device 5 is inserted into the aligned recesses 10c, 6b so that the flange 10 and the edge region 9 of the gas generator opening 8 enclose the reservoir 5a of the cooling device 5 in cross section.

To fix the cooling device 5 to the two recesses that are aligned with one another, the cooling device 5 has a conically shaped head 5d that is widened at its base, surrounds the outflow opening 5b and bears on an edge region, that borders the first recess 10c of the flange 10, of the inner side 10a of the flange 10. Proceeding from the outer side, that faces away from the interior space I, of the base 6, the cooling device 5 is screwed to the base 6 and to the flange 10 of the gas generator 3 with a nut 5e that engages around the reservoir 5a of the cooling device 5 in cross section. The cooling device 5 can of course also be fixed to the base 6 and to the flange 10 in some other known way.

The outflow opening 5b of the cooling device 5 is formed on the reservoir 5a in particular such that the outflow direction R, along which the liquid coolant K is released into the interior space I of the gas sack 2, runs substantially parallel to the main unfolding direction H of the gas sack 2. The cooling effect is provided in that the coolant K is atomized and vaporized by the hot gas situated in the interior space I, with the temperature of the gas being lowered, since energy must be expended in converting the liquid phase of the coolant into the gaseous phase.

Figure 3:
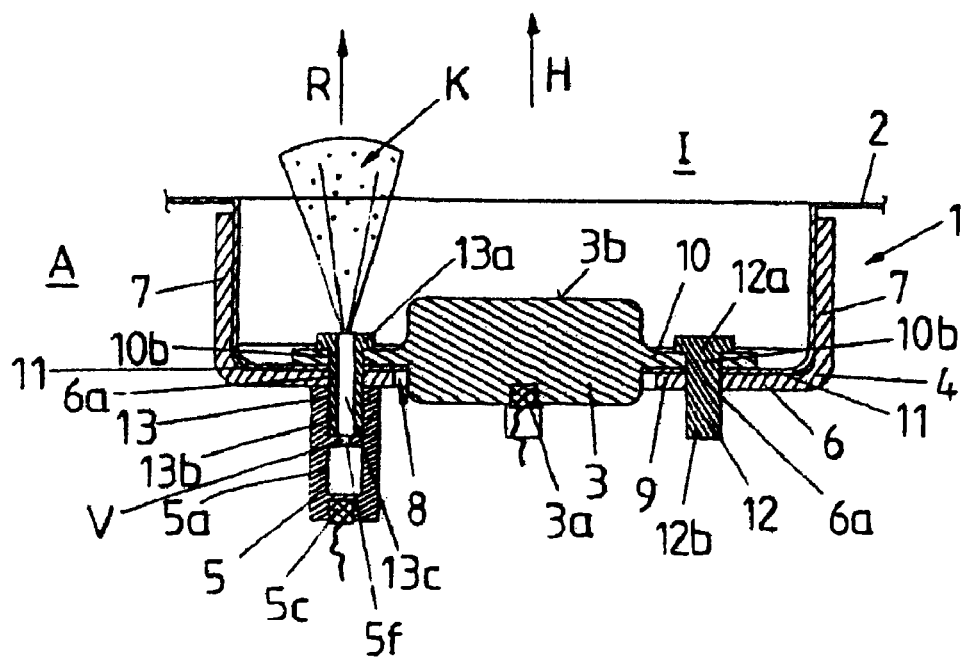
FIG. 3 shows a schematic, sectioned detail view of a modification of the airbag module shown in FIGS. 1 and 2.

FIG. 3 shows a modification of the airbag module 1 shown in FIGS. 1 and 2. Here, in contrast to the cooling device 5 of FIGS. 1 and 2, the housing of the cooling device 5 is formed by a connecting element 13 (corresponding to the connecting element 12 of FIG. 2) and a reservoir 5a that, proceeding from an outer side of the base 6, is connected to a free end region 13b of the connecting element 13 that projects from the outer side of the base 6 counter to the main unfolding direction H. The reservoir 5a has an outflow opening 5f that, before an activation of the cooling device 5, is closed off by the closure V that can be embodied as per FIG. 2. Additionally formed on the connecting element 13 in contrast to the connecting element 12 of FIG. 2 is a passage opening 13c that extends along the main unfolding direction H and connects the interior space I of the gas sack 2 to the reservoir 5a of the cooling device 5 via the outflow opening 5f.

The reservoir 5a of the cooling device 5 can be connected to the free end region 13b of the connecting element 13 that projects from the outer side of the base 6 in particular with a screw connection between the free end region 13b and the reservoir 5a. The free end region 13b has a thread that engages into a thread of the reservoir 5a at a cut-out of the reservoir 5a. According to various embodiments, the reservoir 5a can be adhesively bonded, clamped or welded to the free end 13b of the connecting element 13.

FIG. 4 shows a further modification of the airbag module 1 shown in FIGS. 1 to 3, in which, in contrast to FIGS. 1 to 3, the cooling device 5 is arranged not partially in the exterior space A of the airbag module 1 but rather completely within the interior space I of the airbag module 1 or of the gas sack 2. A recess is provided on an upper side 3b of the gas generator 3 into which the cooling device 5 is fully integrated, so that the reservoir 5a of the cooling device 5 is surrounded in cross section by the gas generator 3 with the exception of the head 5d of the cooling device 5. The widened head 5d of the cooling device 5 bears on an edge region of the upper side 3b of the gas generator 3. The edge region borders the recess in which the cooling device 5 is inserted in a form-fitting manner. The advantage of such an arrangement of the cooling device 5 on the gas generator 3 is in the shaping of the cooling device 5/gas generator 3 unit that is rotationally symmetrical with respect to the main unfolding direction H. The symmetry facilitates the transversely uniform cooling of the gas with respect to the main unfolding direction H. The outflow opening 5b of the cooling device 5 here faces toward the interior space I of the gas sack 2 along the main unfolding direction H.

FIG. 5 shows a schematic sectioned view of a modification of the airbag module 1 shown in FIGS. 1 and 2. In contrast to FIGS. 1 and 2, an additional second cooling device 5 is provided. To fasten the additional cooling device 5 to the airbag module 1, a further first recess 10c is provided on the flange 10 of the gas generator 3, and a further second recess 6b is provided on the edge region 9 of the gas generator opening 8. The recesses are substantially congruent and aligned with one another. The cooling device 5 is, as illustrated in FIG. 2, inserted into the recesses 10c, 6b so that the flange 10 and the edge region 9 of the gas generator opening 8 likewise enclose the reservoir 5a of the further cooling device 5 in cross section. The additional cooling device 5 is situated opposite the other cooling device 5 transversely with respect to the main unfolding direction H so that the gas generator 3 is arranged between the two gas generators 5. Different regions 22, 23 of the gas sack 2 can be cooled independently of one another by the two cooling devices 5. The two regions 22, 23 can for example be a right-hand and a left-hand gas sack half 22, 23 of the gas sack 2. It is thereby possible, in the event of a frontal crash with a lateral component, to provide a pressure profile in the gas sack 2 corresponding to the side component of the collision by local cooling of the right-hand or left-hand gas sack halves 22, 23.

In addition, it is possible to provide a stepped reduction of the gas sack internal pressures with time-offset triggering of the two cooling devices.

FIG. 6 shows a modification of the airbag module 1 shown in FIG. 5, wherein, in contrast to FIG. 5, the right-hand and left-hand gas sack halves 22, 23 form gas sack chambers that are separated from one another, with each gas sack chamber 22, 23 being assigned one of the two cooling devices 5, so that the gas sack internal pressure prevailing in the interior spaces I of the two gas sack chambers 22, 23 can be set independently of one another.

FIG. 7 shows a further modification of the airbag module 1 illustrated in FIG. 6, wherein, in contrast to FIG. 6, a central gas sack chamber 24 that extends along the main unfolding direction H is provided. The central gas sack chamber 24 is arranged between the right-hand and left-hand gas sack chambers 22, 23 transversely with respect to the main unfolding direction H. The central gas sack chamber 24 forms, at a side facing toward a driver F, an impact face for the head of the driver F (occupant). To control the gas internal pressure of the central gas sack chamber 24 of the gas sack 2, a cooling device 5 of the type of FIG. 4 is provided. The cooling device 5 is integrated into the upper side 3b of the gas generator 3 facing toward the occupant F and conveys the coolant K along an outflow direction R that coincides with the main unfolding direction H of the gas sack 2.

FIG. 8 shows a schematic sectioned view of a modification of the airbag module 1 shown in FIGS. 1 and 2, wherein, in contrast to FIGS. 1 and 2, the cooling device 5 generates a bundled coolant jet 60 to destroy a diaphragm 55 that is fixed to the gas sack 2 and covers (from the direction of the exterior or interior space I) a discharge opening 50 of the gas sack 2. The discharge opening 50 can thereby be opened in a time-dependent fashion by the cooling device 5 to ventilate the gas sack 2 (for example in the event of an out of position situation). Here, the jet 60 of the coolant K that is used can be formed such that the diaphragm 55 is destroyed mechanically (e.g., torn). Alternatively, the coolant K can form a solvent for the diaphragm 55, so that the diaphragm 55 is decomposed (e.g., dissolved) by the coolant once the coolant K comes into contact with the diaphragm 55.

In addition, in contrast to FIGS. 1 and 2, the longitudinal axis, that coincides with the outflow direction R, of the cooling device 5 is inclined in relation to the main unfolding direction H, so that the jet 60 can impact against a diaphragm 55 that is provided laterally on the gas sack 2. To form the jet 60, the cooling device 5 has a central nozzle 65 whose outlet cross section is formed to be larger than those of the other outflow openings 5b of the cooling device 5, that serve merely to release the coolant K. The outflow openings 5b are preferably arranged along a circle that encircles the central nozzle 65, so that the coolant K can be introduced into the interior space I of the gas sack 2 cylinder-symmetrically with respect to the jet 60.

FIG. 10 shows a schematic side view of a cooling device 5 of the type shown in FIGS. 1 to 9, having a reservoir 5a in which a liquid coolant is stored. The coolant is introduced into the interior space I of the gas sack 2 as the gas sack 2 is inflated to reduce the gas internal pressure of the gas sack 2. The reservoir 5a of the cooling device 5 has a cylindrical wall with a longitudinal axis that runs along the main unfolding direction H. The reservoir 5a has a conically tapering head 5d with duct-like outflow openings 5b that, adjacent to the wall, are inclined relative to the main unfolding direction H, so that the coolant K can be sprayed into the interior space I of the gas sack 2 at a correspondingly large solid angle around the outflow direction R that coincides with the main unfolding direction H.

A piston 20 is mounted, in a section of the reservoir 5a that is situated opposite the head 5d along the longitudinal axis of the reservoir 5a, to be moveable along the longitudinal axis of the reservoir 5a. As the piston 20 moves in the direction of the head 5d of the reservoir 5a, it presses the coolant K that is stored in the reservoir 5a through the outflow openings 5b into the interior space I of the gas sack 2, with the outflow openings 5b of the reservoir 5a being dimensioned such that the coolant K is atomized into fine droplets as it leaves the reservoir 5a. To seal the reservoir 5a, the piston 20 preferably includes an encircling, outer edge region that bears sealingly against the wall of the reservoir 5a.

The piston 20 is moved from its initial first position into its second position situated closer to the head 5d by a movement generating device 5c that acts, with a pyrotechnically generated gas, on the side of the piston 20 facing away from the head 5d.

Before the release of the coolant K, the outflow openings 5b can be closed off individually or together by a film. Such a film can be provided on the reservoir 5a at the inside or at the outside. The time at which the piston 20 is acted on with a gas (relative to the starting time of the unfolding of the gas sack) is calculated here by an electronic control unit S that is coupled to the movement generating device 5c. According to one embodiment, the time at which the piston 20 is acted upon is calculated as a function of the specified occupant-related or vehicle-related parameters. The calculation of the time takes place in real-time. It is also possible for sensor units S' in the form of pre-crash detectors (e.g., detectors that detect an impending collision that has not yet begun) to be used to detect the stated parameters.

FIG. 11 shows a schematic sectioned view of a modification of the cooling device 5 shown in FIG. 10, wherein in contrast to FIG. 10, no piston 20 is provided, but the coolant K is, before the triggering of the movement generating device 5c, enclosed in a destructible casing in the form of a diaphragm 30. When acted on with the gas provided by the movement generating device 5c, the diaphragm 30 is destroyed and the coolant K is pressed out of the reservoir 5a by the gas pressure generated in the reservoir 5a by the movement generating device 5c.

FIG. 12 shows a schematic sectioned view of a modification of the cooling device 5 shown in FIGS. 10 and 11, in which the piston 20 is mounted with a motor-driven threaded bar 25 to be movable continuously in a reciprocating fashion between a first and a second position in the reservoir 5a. The threaded bar 25 projects from a side facing away from the head 5d of the piston 20, counter to the main unfolding direction H (e.g., along the longitudinal axis of the reservoir 5a). The threaded bar 25 engages a corresponding threaded central recess 26 in a base 27 of the reservoir 5a. The threaded bar 25 is moved toward or away from the outflow openings 5b as it rotates about its longitudinal axis (e.g., along the main unfolding direction H). Accordingly, the piston 20 that is connected to the threaded bar 25 is moved in a reciprocating fashion in the reservoir 5a along the longitudinal axis of the reservoir 5a or of the threaded bar 25. The threaded bar 25 is preferably coupled to a movement generating device 5c in the form of a motor that rotates the threaded bar 25 about its rotational axis to move the piston 20 and release a defined amount of the coolant K.

The movement generating device 5c is coupled, corresponding to FIGS. 10 and 11, to an electronic control unit S that actuates the movement generating device 5c as a function of at least one parameter that can be detected by a sensor unit S' that is coupled to the control unit S. The sensor unit S' detects the at least one parameter multiple times, preferably at regular intervals, during a collision, so that the pressure acting on the coolant K can be controlled to release a defined amount of the coolant K, in real-time by the electronic control unit S that interacts with the movement generating device 5c.

FIG. 13 shows a schematic sectioned view of a further embodiment of a cooling device 5, in which, in contrast to FIGS. 10 to 12, the coolant K itself is pressurized. To release the coolant K, a closure V may be opened by a movement generating device 5c. The closure V preferably being continuously openable, and the outlet cross section of the outflow openings 5b can preferably be varied continuously by the closure V.

To control the outlet cross section of the outflow openings 5b as a function of at least one of the above-specified relevant occupant-related and vehicle-related parameters, the (reversibly working) movement generating device 5c is coupled to an electronic control unit S that calculates, as a function of the at least one parameter that is detected by the sensor unit S' that is coupled to the control unit S, the time at which and the time duration for which the closure V is opened, and actuates the movement generating device 5c correspondingly.

FIG. 14 shows a schematic sectioned view of a modification of the cooling device 5 shown in FIG. 13, wherein in contrast to FIG. 13, the coolant K is not itself under pressure, but rather is acted on by a gas cushion P that is provided in the reservoir 5a and acts on the coolant K via a piston 20.

Figure 17:
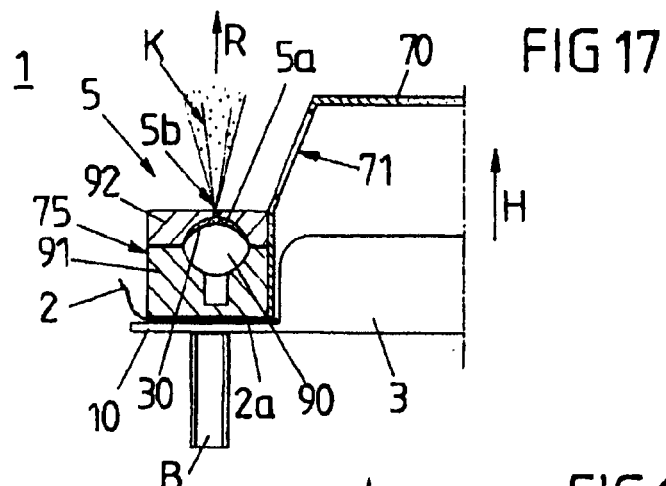
FIG. 17 shows a sectioned detail view of the diffuser shown in FIG. 15, after the triggering of the cooling device.

FIG. 15 shows, in connection with FIGS. 16 and 17, a cap-shaped diffuser 70 that projects into the interior space I of the gas sack 2 through the inflow opening of the gas sack 2 along the main unfolding direction H. A plurality of throughflow openings 71 are provided on the diffuser 70, through which throughflow openings 71 the gas generated by the gas generator 3 for inflating the gas sack 2 can flow into the interior space I of the gas sack 2. To fix the diffuser 70 to an encircling flange 10 of the gas generator 3 (corresponding to FIGS. 1 to 4), the diffuser 70 itself has a flange 75 that can be fixed to the flange 10 of the gas generator 3 and that encircles the diffuser 70 along a peripheral direction U that is aligned transversely with respect to the main unfolding direction H. An edge region 2a, that encircles the inflow opening of the gas sack 2, of the gas sack 2 is preferably clamped, to fix the gas sack 2 to the airbag module 1, between the flange 10 of the gas generator 3 and the flange 75 of the diffuser 70.

Pins B project from the flange 75 of the diffuser 70 counter to the main unfolding direction. The diffuser 70 can be fastened to a part of the airbag module 1 with pins B, in particular to a generator support 4. In addition, the pins B can serve to fasten the entire airbag module 1 to a motor vehicle part.

The flange 75 of the diffuser includes two (shell-like) elements 91, 92, annularly encircling the diffuser, that bear against one another. With respect to the main unfolding direction H, flange includes one upper element 92 and one lower element 91. The two elements 91, 92 have congruent recesses at sides 91a, 92a that face one another and with which said elements bear against one another. The recesses each encircle the diffuser 70 along the peripheral direction U so that the two elements 91, 92 form or delimit an annular chamber.

The chamber is divided by a diaphragm 30, with the—with respect to the main unfolding direction H—upper region, that encircles the diffuser 70, of the chamber forming a reservoir 5a for a coolant K, and the lower encircling region of the chamber, that is separated from the reservoir 5a by the diaphragm 30, forming a pressure chamber 90 that can be filled with gas. To release the coolant K, the upper element 92 has, on a upper side 92b that faces toward the interior space I of the gas sack 2, a plurality of outflow openings 5b that are arranged uniformly along the peripheral direction U on the upper side 92b, and that can be closed off by a film, that is adhesively bonded to the upper side 92b, before a triggering of the cooling device K. In addition, a filling opening 5g is provided on the upper side 92b through which the reservoir 5a can be filled with a coolant K.

To fill the pressure chamber 90 with a gas, the cooling device 5 has a movement generating device 5c in the form of a longitudinally extending gas generator. The gas generator includes a longitudinal axis that is preferably aligned along the main unfolding direction H. As the gas fills the pressure chamber 90, the diaphragm 30 is moved along the main unfolding direction H in the direction of the reservoir 5a (cf. FIG. 17) and presses the coolant K out of the outflow openings 5b. The movement generating device 5c is, corresponding to FIGS. 10 and 11, coupled to an electronic control unit S that actuates the movement generating device 5c as a function of at least one occupant-related or vehicle-related parameter that is detected by a sensor unit S'.

The diaphragm 30 can be fixedly clamped between the two elements 91, 92 that bear against one another, and thereby provide sealing of the chamber (reservoir 5a and pressure chamber 90). One of the two elements, for example the lower element 91, is preferably fixed to the diffuser 70 or integrally formed with the diffuser 70, while the upper element 92 is fixed to the lower element 91. Here, the upper element 92 may be screwed or crimped to the lower element 91 (if appropriate with the interposition of the diaphragm 30) to form the reservoir 5a and the pressure chamber 90.

Figure 18:
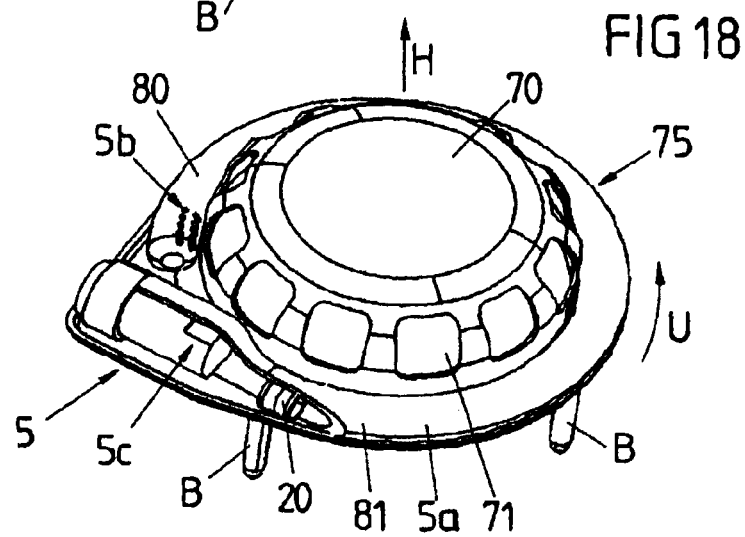
FIG. 18 shows a modification of the diffuser shown in FIG. 15.

FIG. 18 shows a perspective view of a modification of the cooling device 5 shown in FIGS. 15 to 17. Here, the reservoir 5a is preferably of annular design and arranged around the diffuser 70 along the peripheral direction U, with it being possible for the reservoir 5a to be detachably or fixedly connected to the flange 75 of the diffuser 70 (for example by crimping). The reservoir 5a has a first and a second end section 80, 81 that are situated opposite one another along the peripheral direction U. Provided on the upper side, that faces toward the interior space I of the gas sack 2, of the first end section 80 are a plurality of outflow openings 5b that, before the activation of the cooling device, can be closed off for example by a film. In the opposite, second end section 81, a piston 20 that seals off the reservoir 5a is mounted to be moveable along the peripheral direction U. To seal off the reservoir 5a, the piston 20 preferably bears sealingly against the wall of the reservoir 5a. The piston 20 can have an elastic outer edge region (for example made from a rubber). To release the coolant K stored in the reservoir 5a, the piston 20 can be acted on, at a side that faces away from the reservoir 5a, with a gas that is provided by a movement generating device 5c in the form of a longitudinally extending gas generator. The gas generator is coupled, corresponding to FIGS. 10, 11 and 15 to 17, to a control unit S and to a sensor unit S' to activate the cooling device 5.

The movement generating device 5c has a longitudinal axis that runs parallel to the plane of extent of the flange 75 of the diffuser 70 and is aligned with the second end section 81 of the reservoir 5a. The movement generating device 5c is separated from the reservoir 5a merely by the piston 20, and has a casing that is connected to the wall of the reservoir 5a and that is likewise aligned with the second end section 81 of the reservoir 5a. In this way, the cooling device 5 that is shown in FIG. 18 forms a compact unit that can be fixed as a separate sub-module to an encircling flange 75 of a diffuser 70.

Figure 19:
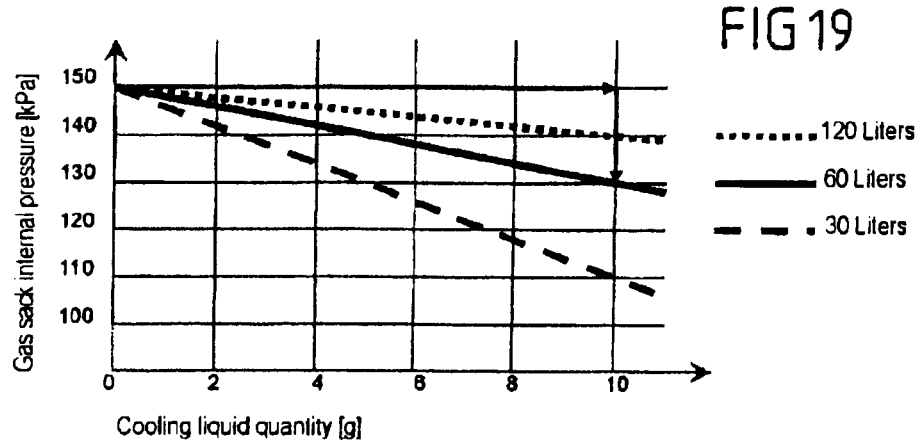
FIG. 19 shows a graphic illustration of the dependency of the gas sack internal pressure on the quantity of introduced cooling fluid for a certain coolant and for three different gas sack volumes.

FIG. 19 shows, in kPa, the pressure (gas sack internal pressure) prevailing in the gas sack 2 of the type shown in FIGS. 1 and 2, as a function of the cooling liquid quantity (in grams) introduced into the interior space I of the gas sack 2, for three different volumes of the interior space I of the gas sack 2. According to the exemplary embodiment shown in FIG. 19, pressures for 120 liters (dotted line), 60 liters (continuous line) and for 30 liters (dashed line) are shown. As can be gathered from the illustration, the relationship between the gas sack internal pressure and the introduced cooling liquid is approximately linear.

The priority application, German Patent Application No. 10 2006 010 953.8, filed Mar. 3, 2006 including the specification, drawings, claims and abstract, is incorporated herein by reference in its entirety.

Given the disclosure of the present invention, one versed in the art would appreciate that there may be other embodiments and modifications within the scope and spirit of the invention.

Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag module for a motor vehicle, comprising:
a gas sack that can be inflated with gas to protect an occupant,
a gas generator for generating the gas provided for inflating the gas sack,
an additional cooling device comprising an openable reservoir for storing a coolant, with the reservoir being designed to be opened, so that the coolant for cooling the gas in the gas sack can come into contact with said gas,
a flange encircling in a peripheral direction for fixing the gas sack to a part of the airbag module,
wherein the reservoir is arranged on the flange and extends in the peripheral direction along the flange.

2. The airbag module as claimed in claim 1, wherein the cooling device comprises a diffuser that deflects the gases that are generated by the gas generator for inflating the gas sack.

3. The airbag module as claimed in claim 2, wherein the diffuser comprises said flange.

4. The airbag module as claimed in claim 2, wherein the cooling device is integrated into the diffuser.

5. The airbag module as claimed in 2, wherein the cooling device forms a separate sub-module that can be fastened to the diffuser.

6. The airbag module as claimed in claim 1, wherein the cooling device comprises a movement generating device that opens the reservoir to release the coolant.

7. The airbag module as claimed in claim 6, wherein the movement generating device releases the coolant, to open a closure of an outflow opening of the reservoir, through which the coolant can be released.

8. The airbag module as claimed in claim 1, wherein the cooling device acts on the coolant with a gas via a diaphragm.

9. The airbag module as claimed in claim 8, wherein the coolant is enclosed by the diaphragm.

10. The airbag module as claimed in claim 1, wherein a plurality of outflow openings for releasing the coolant are provided.

11. The airbag module as claimed in claim 10, wherein the outflow openings are formed on a first end section of the reservoir.

12. The airbag module as claimed in claim 11, wherein the reservoir includes a second end section situated opposite the first end section, and wherein a piston is arranged in the second end section such that it can be moved from a first into a second position to release the coolant.

13. The airbag module as claimed in claim 10, wherein the outflow openings are distributed uniformly in the peripheral direction on the upper side of the reservoir.

14. The airbag module as claimed in claim 1, wherein a pressure chamber extends along the reservoir and can be filled with gas to pressurize the coolant.

15. The airbag module as claimed in claim 14, wherein the pressure chamber and the reservoir are separated from one another by a diaphragm.

16. The airbag module as claimed in claim 15, wherein a movement generating device generates a gas, acting on the diaphragm in the pressure chamber.

17. The airbag module as claimed in claim 14, wherein the reservoir and/or the pressure chamber is formed in one piece with the flange.

18. The airbag module as claimed in claim 1, wherein the temperature of the gas in the gas sack can be influenced by the cooling device irrespective of the time of activation of the gas generator.

* * * * *